(12) United States Patent
Yang et al.

(10) Patent No.: US 9,772,149 B2
(45) Date of Patent: Sep. 26, 2017

(54) METHOD FOR IMPROVING WALL HEAT TRANSFER IN A CHEMICAL REACTOR

(71) Applicant: IntraMicron, Inc., Auburn, AL (US)

(72) Inventors: Hongyun Yang, Auburn, AL (US); Paul S. Dimick, Waverly, AL (US); Bruce J. Tatarchuk, Auburn, AL (US)

(73) Assignee: Intramicron, Inc., Auburn, AL (US)

( * ) Notice: Subject to any disclaimer, the term of this patent is extended or adjusted under 35 U.S.C. 154(b) by 5 days.

(21) Appl. No.: 14/413,995

(22) PCT Filed: Mar. 13, 2013

(86) PCT No.: PCT/US2013/030837
§ 371 (c)(1),
(2) Date: Jan. 9, 2015

(87) PCT Pub. No.: WO2014/011225
PCT Pub. Date: Jan. 16, 2014

(65) Prior Publication Data
US 2015/0192375 A1    Jul. 9, 2015

Related U.S. Application Data

(60) Provisional application No. 61/669,918, filed on Jul. 10, 2012.

(51) Int. Cl.
*F28F 13/18* (2006.01)
*B01J 19/32* (2006.01)
(Continued)

(52) U.S. Cl.
CPC ......... *F28F 13/185* (2013.01); *B01J 19/2495* (2013.01); *B01J 19/32* (2013.01);
(Continued)

(58) Field of Classification Search
None
See application file for complete search history.

(56) References Cited

U.S. PATENT DOCUMENTS 3,384,154 A * 5/1968 Milton .................. B01D 1/22
165/111
3,396,782 A * 8/1968 Valyi .................. B22F 7/002
122/33

(Continued)

FOREIGN PATENT DOCUMENTS

| DE | 4409026 | 11/1995 |
| DE | 102007059153 | 6/2009 |
| EP | 1602627 | 12/2005 |

OTHER PUBLICATIONS

Agyenim, et al., "A review of materials, hear transfer and phase change problem formulation for latent heat thermal energy storage systems (LHTESS)", Renew Sustain Energy Rev., 14:615-28 (2010).

(Continued)

*Primary Examiner* — Devang R Patel
(74) *Attorney, Agent, or Firm* — Pabst Patent Group LLP

(57) ABSTRACT

Methods for improving heat transfer at the interface between the internal reactor wall and mesh media containing microfibrous entrapped catalysts (MFECs) and/or microfibrous entrapped sorbents (MFESs) are described herein. Improved (e.g., more rapid) heat transfer can be achieved using a variety of approaches including increasing the contacting area of the interface between the mesh media and the reactor wall so that more contacting points are formed, enhancing the contacting efficiency at the contacting points between the mesh media and the reactor wall, increasing the number of contact points between the mesh media and the reactor wall using fine fibers, and combinations thereof.

18 Claims, 2 Drawing Sheets

(51) Int. Cl.
*B01J 19/24* (2006.01)
*F28F 1/40* (2006.01)
*B23K 1/00* (2006.01)
*B23K 31/02* (2006.01)
*B01J 35/06* (2006.01)
*F28D 21/00* (2006.01)
*F28F 13/00* (2006.01)

(52) U.S. Cl.
CPC ............ B23K 1/0012 (2013.01); B23K 31/02 (2013.01); F28F 1/405 (2013.01); F28F 13/00 (2013.01); *B01J 35/06* (2013.01); *F28D 2021/0022* (2013.01); *F28F 2013/001* (2013.01); *F28F 2013/005* (2013.01); *Y10T 29/49352* (2015.01)

(56) References Cited

U.S. PATENT DOCUMENTS

| | | | |
|---|---|---|---|
| 3,857,680 | A | 12/1974 | Montalenti |
| 3,984,222 | A * | 10/1976 | DeHaan ............... F25D 3/10 165/179 |
| 4,246,057 | A * | 1/1981 | Janowski ............. B22F 3/1137 138/144 |
| 5,035,837 | A * | 7/1991 | Saeki ................... B22F 1/0059 106/1.13 |
| 5,102,745 | A * | 4/1992 | Tatarchuk ............ B22F 3/002 428/605 |
| 2003/0056943 | A1 * | 3/2003 | Dessiatoun ............... F28D 7/00 165/142 |
| 2004/0182556 | A1 | 9/2004 | Jahn |
| 2011/0135543 | A1 | 6/2011 | Tatarchuk |

OTHER PUBLICATIONS

Jegadheeswaran and Pohekar, "Performance enhancement in latent heat thermal storyage system: A review", Renew Sustain Energy Rev., 13:225-44 (2009).
Khateeb, et al., Design and simulation of a lithium,-ion battery with a phase change material thermal management system or an electric scooter\, J Power Sources, 128:292-307 (2004).
Kizilel, et al., "Passive control of temperature excursion and uniformity in high-energy li-ion battery packs at high current and ambient temperature", J Power Sources, 183:370-5 (2008).
Mills, et al., "Thermal conductivity enhancement of phase change materials using a graphite matrix", App Thermal Eng., 26:1652-61 (2006).
Rao and Zhang, "Thermal properties of paraffin wax-based composites containing graphite", Energy Sources, Part A, 33:587-93 (2010).
Rao and Wang, "A review of power battery thermal energy management", Renew Sustain Energy Rev., 15:4554-71 (2011).
Sheng, et al., "High conductivity catalyst structures for application in exothermic reactions", Appl Catalyst A Gen., 445-446:143-52 (2012).
International Search Report and Written Opinion for corresponding PCT Application PCT/US2013/030837 dated Dec. 2, 2013.

* cited by examiner

METHOD FOR IMPROVING WALL HEAT TRANSFER IN A CHEMICAL REACTOR

CROSS-REFERENCE TO RELATED APPLICATIONS

This application is a 371 application of International Application No. PCT/US2013/030837, filed Mar. 13, 2013, which claims benefit of U.S. Provisional Application Nos. 61/669,918, filed Jul. 10, 2012.

STATEMENT REGARDING FEDERALLY SPONSORED RESEARCH OR DEVELOPMENT

This invention was made with government support under Grant No. ARMY-W56HZV-05-C0686 awarded by the U.S. Army. The government has certain rights in the invention.

FIELD OF THE INVENTION

This invention is generally in the field of heterogeneous catalysis, particularly structural catalysts.

BACKGROUND OF THE INVENTION

Microfibrous entrapped catalysts (MFECs) have been developed for strong exothermic or endothermic processes. The sintered metal microfibrous structure can collect the heat from the catalyst particles, where the reaction heat is generated and transfer it to the internal reactor wall-MFEC contacting interface. MFECs made of copper microfibers demonstrate 50-200 times enhancement in effective thermal conductivity compared with typical packed catalyst beds (Sheng and Yang, 2012). Because MFECs are flexible, they can be deformed to match any solid surface geometry. The heat transfer at the wall-MFEC interface is comparable to the heat transfer of a phase change (e.g. water evaporation), which is a very fast heat transfer approach.

Because of these fast heat transfer characteristics, MFECs can provide uniform temperature profiles and enable fine temperature control for strong exothermic and endothermic reaction/processes even at fast reaction rates. This is critical to temperature sensitive reactions or processes, especially reactions or processes that are strongly exothermic or endothermic, for example Fischer Tropsch synthesis, methanol synthesis, ethyl oxide formation, and the like.

According to a heat transfer resistance analysis of a MFEC-wall system (FIG. 1), the heat transfer resistance on the wall-MFEC interface accounts for 75% of overall heat transfer resistance in the system. This result suggests that the wall MFEC-contacting interface becomes the limiting step for heat transfer. In order to further improve heat transfer, the interfacial heat transfer must be improved.

Therefore, it is an object of the invention to provide methods for improving heat transfer at the wall-MFEC interface.

The principle of heat transfer can be described in terms of effective thermal conductivity by equation 1, $$Q = k \frac{A}{l} \Delta T \quad \text{Equation 1}$$

where Q is heat transfer rate, k is the effective thermal conductivity, A is the heat transfer area, and l the heat transfer distance, and $\Delta T$ is the temperature gradient at wall. In most cases, l is a constant determined by the size of reactor and a low $\Delta T$ and a high Q are desired simultaneously. In these cases, faster heat transfer rate (Q) can be achieved commonly by improving the effective thermal conductivity (k) at the internal wall and increasing heat transfer area (A).

Increasing heat transfer area (A) is a common approach used to improve the heat transfer from gas stream passing through the heat exchanging tube. It will certainly benefit the microfibrous media, microfibrous entrapped catalysts (MFEC) or microfibrous entrapped sorbents (MFES). Due to the unique characteristics of microfibrous media, such as flexibility and deformability, increase in heat transfer area (A) will bring more benefits. Moreover, specific approaches can be taken to improve the k of the heat transfer process.

SUMMARY OF THE INVENTION

Methods for improving heat transfer at the interface between an internal reactor wall and mesh media containing microfibrous entrapped catalysts (MFECs) and/or microfibrous entrapped sorbents (MFESs) are described herein. Improved (e.g., more rapid) heat transfer can be achieved using a variety of approaches including (1) roughening the contacting surface of the interface between the mesh media and the reactor wall, (2) enhancing the contacting efficiency at the contacting points between the mesh media and the reactor wall, (3) increasing the number of contact points between the mesh media and the reactor wall using fine fibers, and combinations thereof. These approaches address both the heat transfer area (A) and the effective thermal conductivity (k).

As mentioned above, increasing contact area will improve heat transfer at the wall, using a method such as roughening the internal wall surface. In the proposed approach, micropatterns such as grooves, channels, humps, fins and sintered fibers can be made on the inner heat transfer surfaces. This allows the heat transfer area (A) to be increased significantly. Moreover, microfibrous media and MFEC are very flexible and malleable and can be deformed to match the rough surface, which can be generated by micro-patterning. As a result, more contacting point can be formed and provide improve effective thermal conductivity (k). Typical packed particles or extrudates are too big or too rigid to access the surface of micro-patterns. Therefore they cannot enjoy the improvement in effective thermal conductivity.

The second approach focuses on improving contact efficiency and minimizing interfacial heat transfer resistances. Ideally the inner wall and fibrous media are made of the same material (e.g. copper) and they form a single phase (i.e. continuous copper phase) without interfaces. This will certainly improve the thermal conductivity. From a different point of view, the fibers can be treated as the extension of the wall surface (increasing in heat transfer area A) when this continuous phase is formed. This ideal case can be realized by "welding" fibers on the heat transfer surface made of the same materials (FIG. 4C). In a less ideal case, fibers can be compressed, abraded and deformed on the heat transfer surface due to the tight packing during microfibrous media or MFEC loading (FIG. 4B). The wall and fibers are still two different phases. But the contacting resistance is much lower than that of a point contacts due to lose packing (FIG. 4A).

The third approach is using fine fibers to generate more contacting points and larger heat transfer area. If the fiber length and fiber volume are fixed, the smaller-diameter fibers will have much higher fiber counts than large-diameter fibers. For example, the fiber counts of 6 micron fibers will be 1/16 of that of 24 micron fibers. Replacing 10% of 24 micron fibers with 6 micron, will more than double the contact point count, and available fiber surface area increases by 30%. Moreover, small fibers are more flexible and can more-easily access more surface area generated by micro patterns. According to the discussion presented in the first and second approaches, the use of small fibers will certainly enhance the heat transfer area (A) and thermal conductivity (k).

DETAILED DESCRIPTION OF THE INVENTION

I. Definitions

Figure 1:
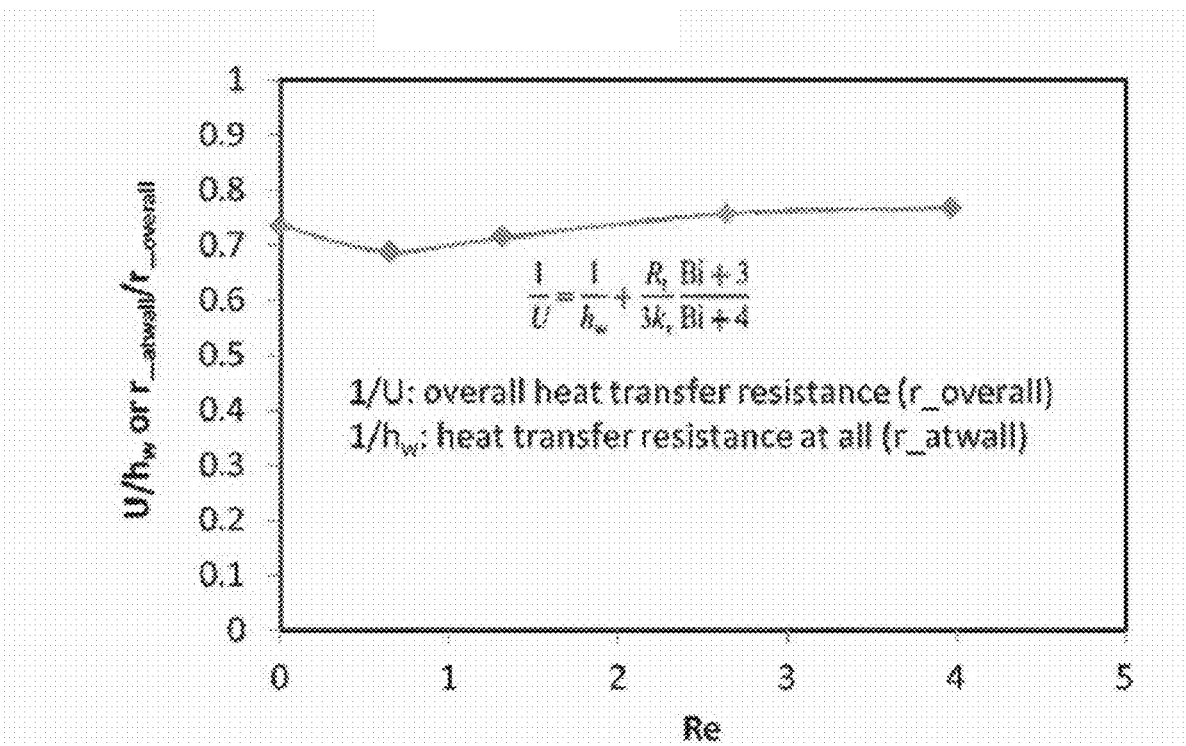
FIG. 1 is an analytical result of heat transfer resistance at the wall-MFEC interface for a 4 inch reactor tube.

"Increasing the contact area on the interface", as used herein, means increasing the contact surface area relative to a smooth heat transfer surface.

"Improving the contact efficiency" as used herein, means improving the contact efficiency area relative to a smooth heat transfer surface.

"Increasing the number of contact points" as used herein, means increasing the number of contact points relative to fibers typically used in the art, which are about 12 to about 75 microns. The number of contact points can be increased by reducing the size of the fibers, for example, to about 0.5 to about 12 microns.

"Diameter", as used herein, refers to all the diameters of the fibers.

"Length", as used herein, all lengths of the fibers.

II. Methods for Improving Heat Transfer Between Mesh Media and Reactor Wall

Methods for improving heat transfer between mesh media containing MFECs and/or MFESs and the inner walls of reactor vessels are described herein. Improved (e.g., more rapid) heat transfer can be achieved using a variety of approaches including increasing the contact area at the interface between the mesh media and the reactor wall so that more contact points are formed, enhancing the contact efficiency at the contact points between the mesh media and the reactor wall, increasing the number of contact points between the mesh media and the reactor wall using fine fibers, and combinations thereof.

In one embodiment, heat transfer is improved by increasing the contact area between the mesh media containing the MFECs and/or MFESs so that the number of contact points is increased. This can be achieved by packing oversized media cocentrically into the reactor, typically a tube. The flexible media can be deformed to match the shape of the internal reactor wall. This utilizes almost all the internal surface of the reactor tube as the heat transfer area.

In order to further enhance the heat transfer area, the interior walls can be roughened. The roughened surface can be generated by thermally sintering a thin layer of microfibrous media made of very fine fibers onto the inner reactor wall. The fine microfibrous media increase the contacting area on the wall. Similarly the surface roughening can also be achieved by adding a soldering agent (e.g. CuO) in form of fine powders on the reactor wall. The soldering agent forms thousands of tiny bumps on the inner surface of the reactor wall increasing the heat transfer surface. The roughened surface can be made of mechanical patterns. Mechanical patterns can be produced by techniques known in the art, such as progressive groove cutting, button rifling, thread generation, etc. Interior patterns may also be produced during specialized extrusion operations. Microfiber media stacks on rods can be subsequently loaded into these tubes, with minimal cutting or abrasion of the media, by pushing or pulling media stacks into the reactor tubes and simultaneous twisting them at the same rate of twist as the grooves and patterning that were formed on the interior of the tube.

In another embodiment, heat transfer is improved by enhancing the contacting efficiency at the contacting points. A soldered or compressed contact point more efficiently transfer heat than a loosely attached or associated contact point. After the media is loaded inside the reactor, the solder agent pre-loaded on the interface between the MFEC assembly and the inner reactor wall forms metal junctions, which connect the inner reactor wall and media. These interactions should provide better contacting than physical compression. Besides thermal or thermo-chemical sintering processes, inductive sintering is particularly useful because the sintering will occur mainly at the contacting points such as fiber-fiber contacting points and fiber-inner wall contact points, etc.

In still another embodiment, heat transfer is improved by increasing the number of contacting points through the use of finer fibers. When the fiber diameter is reduced by a factor of 4 while maintaining the same fiber length and total fiber weight, the fiber counts increases 4 times and contacting points also increase 4 times. Moreover, the external surface area of the fibers also increases 2 times, which generates more area for heat exchange between microfibrous media and fluids passing through the media.

The techniques above can be used to increase the area for heat transfer at least 10%, 15%, 20%, 25%, 30%, 35%, 40%, 45%, 50%, or greater compared to known methods for loading mesh media into reactors.

EXAMPLES

Example 1

Fine Structural Patterns to Increase Heat Transfer on the Reactor Wall

As shown in FIG. 1, the heat transfer area on the inner reactor wall can be increased by cutting groove patterns on the surface and creating small bumps on the inner surface using solder chemicals. Because the microfibrous media are very flexible, they can be deformed to match the roughened the surface of the wall. The heat transfer area is increased by these fine structures.

Figure 2:
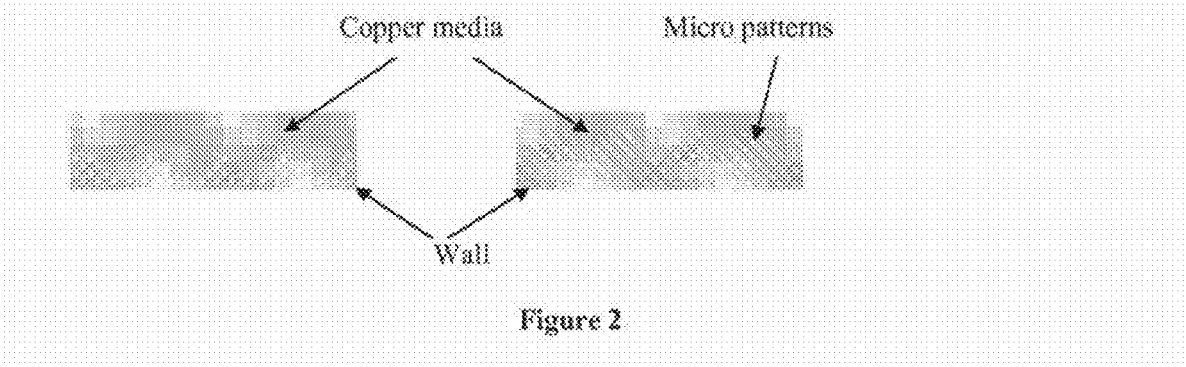
FIG. 2 is a schematic showing surface area improvement using (a) groove patterns cut on the internal reactor wall and (b) fine structures (humps) generated by solder powders on the reactor wall.

In practice, the edges of the fine structures are generally smoothed. The groove pattern in actual use is shown in FIG. 2. Heat transfer area was increased by about 34%.

Example 2

Improving Contact Efficiency at Reactor Wall

Figure 3:
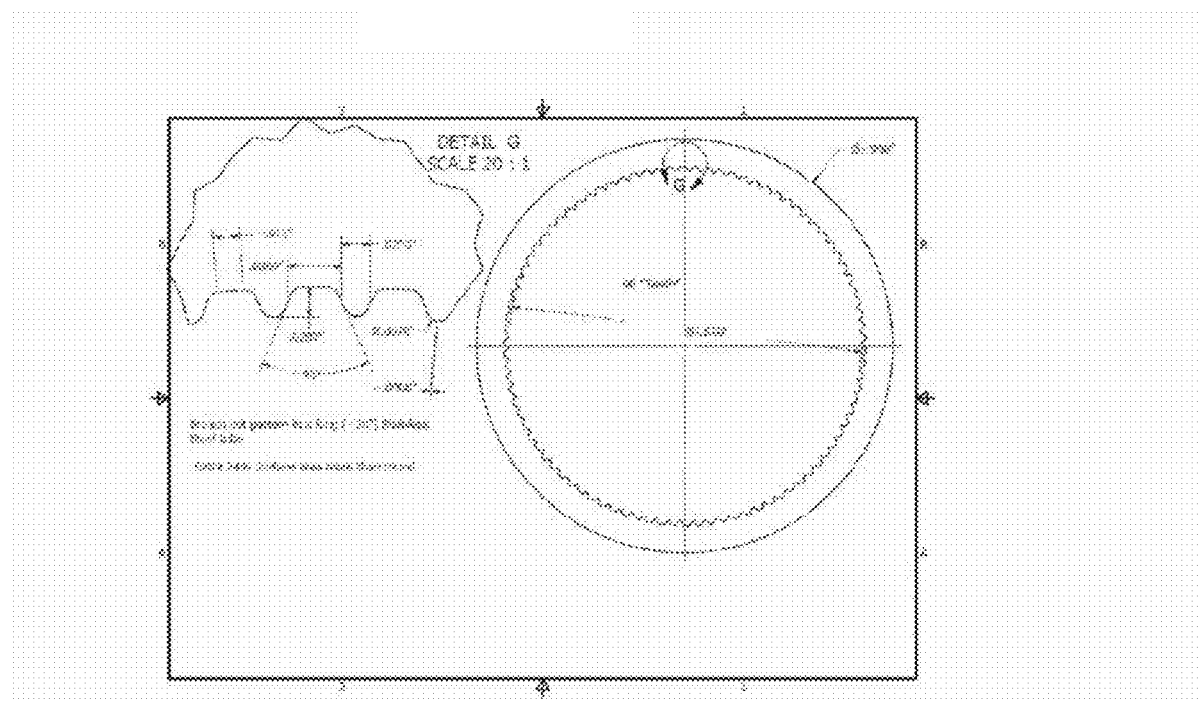
FIG. 3 is a schematic showing a groove pattern inside the reactor tube.
Figure 4:
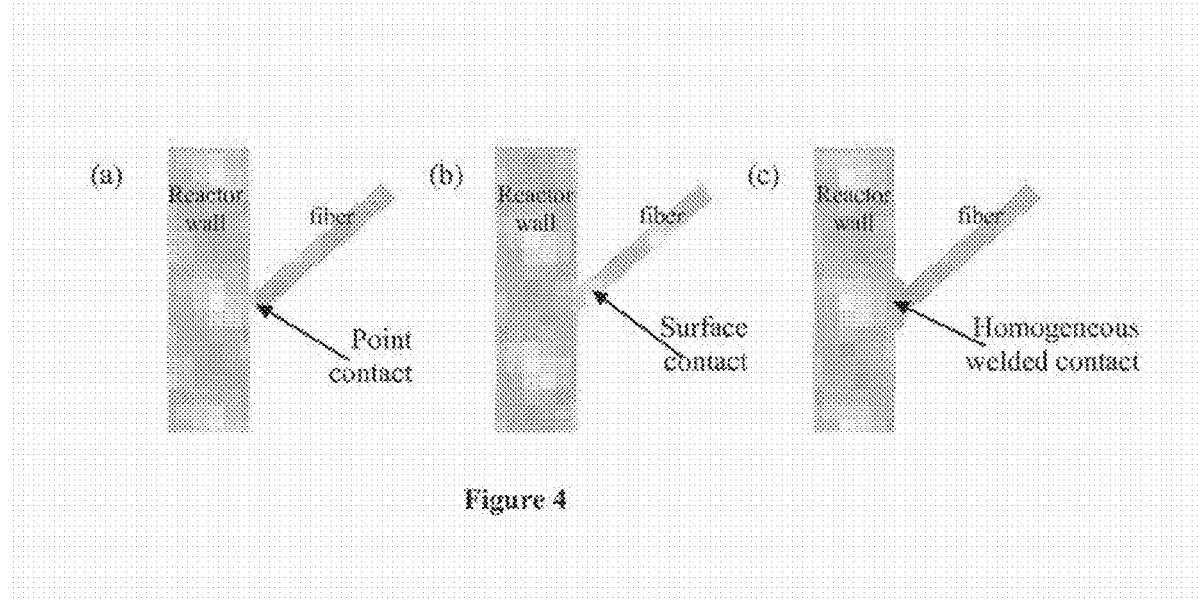
FIG. 4 is a schematic showing different contacting styles (a) loosely attached contact, (b) compressed surface contact; and (c) homogeneous welded contact generated by solder powders.

Various contacting styles between the fibers and the reactor wall are shown in FIG. 3. The contact point is formed when the media is not compressed on the reactor wall. There is very limited area to conduct the heat due to the nature of the contact point. The second contact, surface contact, is generated by deforming the surface of copper fibers when a slightly larger diameter microfibrous media is inserted into the reactor tube. This media has a much larger area for heat transfer. The third contact, homogeneous welded contact, is generated by welding the fibers and the reactor wall together, which is typically carried out using solder chemicals. It should generate the largest heat transfer area among these three contacting styles. Moreover, it is the welding contact that creates homogeneous contacting and enables the lower heat transfer resistance.

We claim:

1. A method for improving heat transfer of a reactor wherein the reactor comprises mesh media comprising microfibrous entrapped catalysts (MFEC) and/or microfibrous entrapped sorbents (MFES), wherein the mesh media comprises micron-sized fibers, the method comprising:
sintering the mesh media to an interior reactor wall to form metal junctions between the interior reactor wall and the micron-sized fibers, wherein the sintering step is a thermo-chemical sintering process comprising the step of applying a reducing gas, wherein the mesh media and the interior wall comprise a material that is the same, and wherein prior to the step of applying a reducing gas, the mesh media comprises fibers of a metal oxide.

2. The method of claim 1, wherein the micron-sized fibers have a diameter of about 6-200 μm.

3. The method of claim 1, wherein the micron-sized fibers have a length of about 1-50 millimeters.

4. The method of claim 1, wherein the micron-sized fibers are made of thermally conductive metals and other thermally conductive materials.

5. The method of claim 1, wherein the mesh media comprises one or more fibers of different diameters, lengths, and/or composition.

6. The method of claim 1, further comprising forming grooves, screw threads, or other patterns to increase the surface area of the interior reactor wall.

7. The method of claim 1, further comprising incorporating fine structures onto the interior reactor wall to increase the surface area of the interior reactor wall.

8. The method of claim 1, wherein the mesh media has a larger external diameter than the inner diameter of the reactor prior to loading the mesh media into the reactor.

9. The method of claim 6, wherein the mesh media is compressed and packed to match the external surface of the grooves, thread and other patterns.

10. The method of claim 1, wherein the microfibrous media are made of the same material as the interior wall.

11. The method of claim 1, further comprising improving the contact efficiency between the mesh media and the reactor wall by deforming the MFEC/MFES's on the reactor wall.

12. The method of claim 2, wherein the micron-sized fibers have a diameter of about 12-100 μm.

13. The method of claim 3, wherein the micron-sized fibers have length of about 3-10 millimeters.

14. The method of claim 4, wherein the thermally conductive metals are selected from the group consisting of aluminum, copper, and silver.

15. The method of claim 4, wherein the other thermally conductive materials are selected from the group consisting of metal alloys and thermally conductive ceramics.

16. The method of claim 7, wherein the fine structures are selected from the group consisting of fins, pins, humps, grooves, fine fibers, and thin microfibrous media made of fine metal fibers.

17. The method of claim 1, wherein the micron-sized fibers have a diameter of about 0.5 to 50 μm.

18. The method of claim 1, wherein the micron-sized fibers and the interior wall comprise copper.

* * * * *

UNITED STATES PATENT AND TRADEMARK OFFICE
CERTIFICATE OF CORRECTION

PATENT NO. : 9,772,149 B2
APPLICATION NO. : 14/413995
DATED : September 26, 2017
INVENTOR(S) : Hongyun Yang, Paul S. Dimick and Bruce J. Tatarchuk It is certified that error appears in the above-identified patent and that said Letters Patent is hereby corrected as shown below:

In the Specification

Column 1, Line 34, replace "the" with --they--.
Column 2, Line 42, replace "contacting point" with --contacting points--.
Column 4, Line 56, replace "the surface" with --surface--.

In the Claims

Claim 13, Column 6, Line 23, replace "have length" with --have a length--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*